United States Patent [19]

Kobayashi

[11] 4,436,397
[45] Mar. 13, 1984

[54] PHOTOGRAPHIC INFORMATION DISPLAY SYSTEMS FOR USE IN PHOTOGRAPHIC CAMERAS

[75] Inventor: Takeo Kobayashi, Tokyo, Japan

[73] Assignee: Asahi Kogaku Kogyo Kabushiki Kaisha, Tokyo, Japan

[21] Appl. No.: 363,006

[22] Filed: Mar. 29, 1982

[30] Foreign Application Priority Data

May 28, 1981 [JP] Japan .................................. 56-81297

[51] Int. Cl.³ ............................................ G03B 17/20
[52] U.S. Cl. .................................................. 354/465
[58] Field of Search ........................ 354/53, 60 L, 289

[56] References Cited

U.S. PATENT DOCUMENTS 4,040,067  8/1977  Kondo .............................. 354/53 X
4,095,243  6/1978  Numata et al. .................... 354/53 X
4,198,148  4/1980  Tano ................................. 354/53 X Primary Examiner—Michael L. Gellner

[57] ABSTRACT

Various photographic informations such as brightness of an object to be photographed, an iris opening, sensitivity of a film, etc. are applied to an arithmetic operation circuit in the form of digital signals. The arithmetic operation circuit calculates an optimum shutter speed, and digital code bits representing the shutter speed is decoded by a decoder and then applied to luminous digits. A display control circuit is provided for sequentially operating the luminous digits whereby the display digits are sequentially turned on or off to display the photographic informations or to give an alarm to a user of the camera.

7 Claims, 4 Drawing Figures

PHOTOGRAPHIC INFORMATION DISPLAY SYSTEMS FOR USE IN PHOTOGRAPHIC CAMERAS

BACKGROUND OF THE INVENTION

This invention relates to a photographic information display system for digitally displaying various photographing informations in a finder of a photographic camera.

In a prior art photograph information display device various informations or alarms such as drop in a battery voltage, an alarm regarding hand trembling, an alarm regarding a range in which the light measured can be interlocked with a shutter mechanism and an alarm showing an over or under range of interlocking are digitally displayed at a suitable portion of the field of view of the finder of a camera. Such displays were made by turning on or off digits, or by changing the period of turning on or off the digits for classifying them according to the type of the informations, or by varying the ratio (duty) of the on time to the off time for making easy user's confirmation of the information or alarm. However, in a system for displaying a number of informations or alarms, with such simple display operated by a on-off control it is difficult for the user to instantly identify the type of the informations and alarms.

SUMMARY OF THE INVENTION

It is therefore an object of this invention to provide a novel photographic information display system with which the user of a photographic camera can instantly identify the type of informations and can give an alarm to the user of the camera.

Another object of this invention is to provide a photographic information display system capable of operating in an iris priority type exposure mode or a shutter priority type exposure mode and also capable of giving a hand trembling alarm.

According to this invention there is provided a photographic information display system of a photographic camera having a finder, comprising a plurality of digits arranged in a field of the finder, an arithmetic operation circuit inputted with digital photographic informations for producing digital code bits, a decoder for decoding the digital code bits to produce output signals supplied to the plurality of digits, and display control means which judges whether a photographic information outputted from the arithmetic operation circuit is adequate or not for producing successively lagged pulse signals which are applied to the decoder for sequentially turning on or off the digits at a predetermined period thereby displaying the photographic informations or giving an alarm to a user of the photographic camera.

DESCRIPTION OF THE PREFERRED EMBODIMENT

Figure 1:
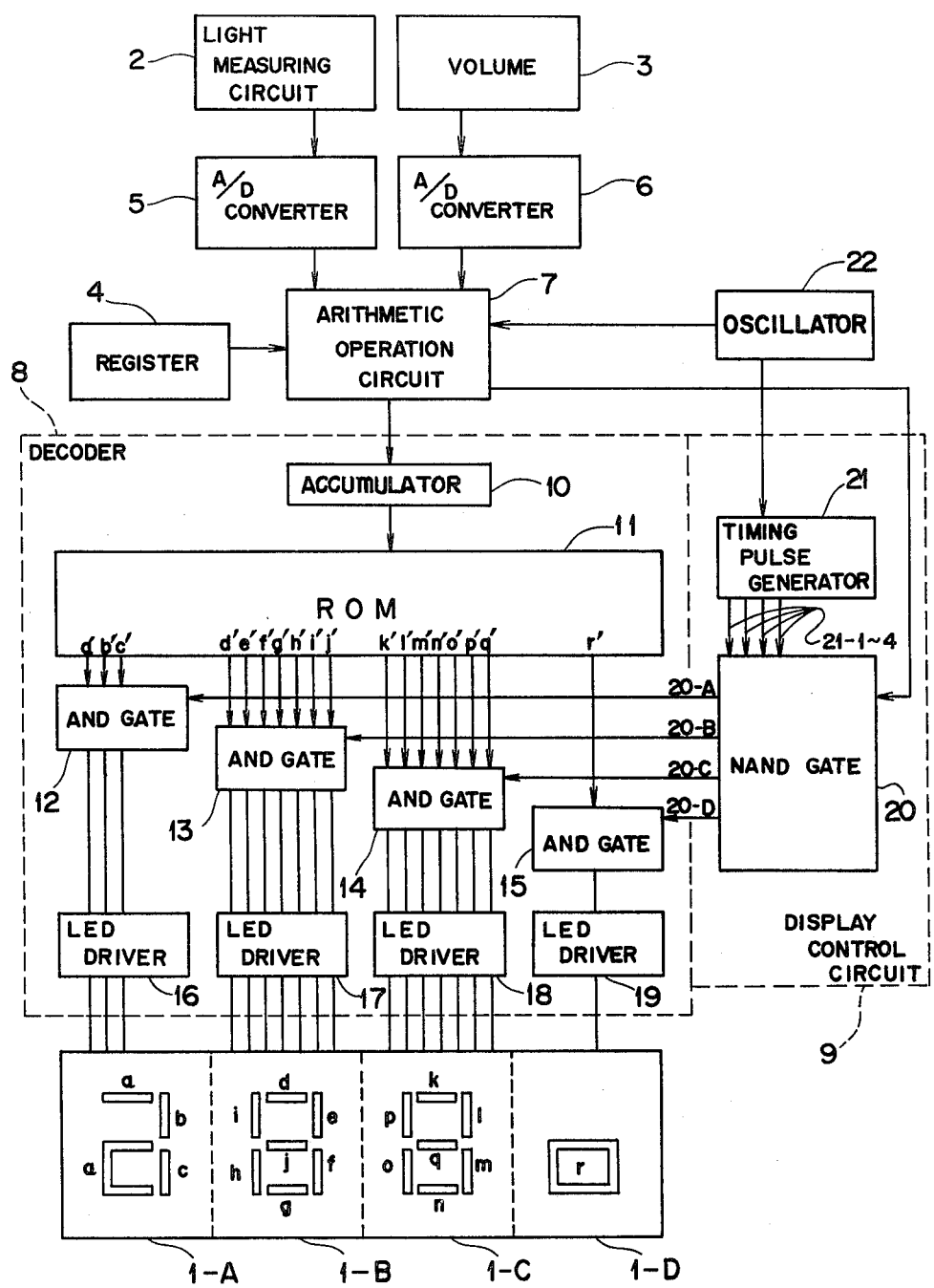
FIG. 1 is a block diagram showing a preferred embodiment of the photographic information display system embodying the invention.
Figure 2:
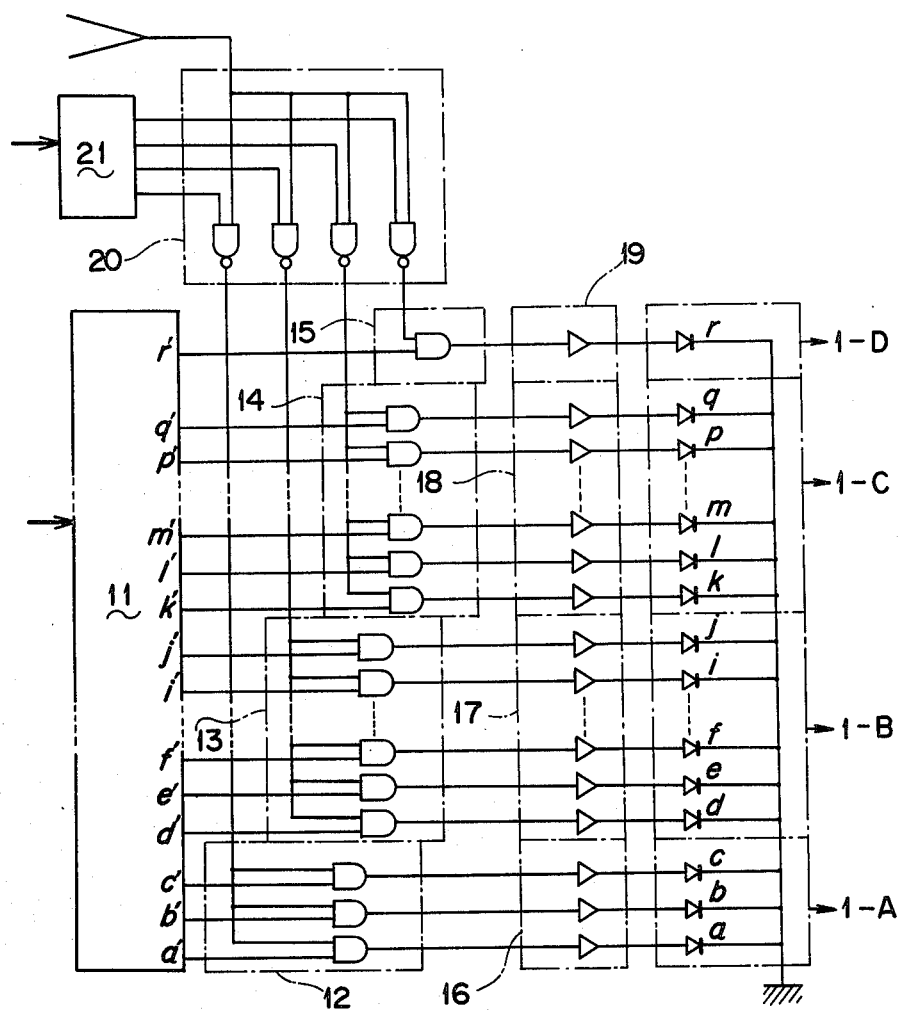
FIG. 2 is a connection diagram showing the detail of a portion of the circuit shown in FIG. 1.

The following embodiment relates to an iris priority type exposure mode wherein a photographic information, typically a shutter speed is displayed by a plurality of light emitting diode (LED) digits 1-A through 1-D disposed in the field of view of a finder. In this example, the brightness information $B_v$ of an object to be photographed is supplied from a light measuring circuit, the iris opening information $A_v$ of a camera lense is supplied from a volume (variable resistor) 2, a set shutter speed information $T_v$, a film sensitivity information $S_v$, and a set iris opening information $A_v$ are supplied from a register 4. An object brightness information $B_v$ from the light measuring circuit 2 and a iris opening information $A_v$ from the volume 3 are respectively applied to analogue digital converters 5 and 6. The digital outputs of the register 4 and the A/D converters 5 and 6 are applied to an arithmetic operation circuit 7 which judges whether the digital brightness information is in a measured light correction range or not and calculates an optimum shutter speed by utilizing digital values inputted thereto. The arithmetic operation circuit 7 also judges whether the optimum shutter speed is in the control range of the camera or not. The output of the arithmetic operation circuit 7 is applied to a decoder 10 which sends code bits shown in the following table to LED digits 1-A through 1-D corresponding to the calculated shutter speed, and to a display control circuit 9 connected to control the output of the decoder 8 in accordance with an alarm signal representing whether a photographic information from the arithmetic operation circuit is optimum or not.

| MSB | | CODE | | LSB | DIGITAL DISPLAY |
|---|---|---|---|---|---|
| 1 | 1 | 1 | 1 | | 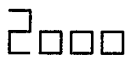 |
| 1 | 1 | 1 | 0 | |  |
| 1 | 1 | 0 | 1 | |  |
| 1 | 1 | 0 | 0 | |  |
| 0 | 0 | 0 | 1 | |  |
| 0 | 0 | 0 | 0 | |  |

The decoder 8 comprises an accumulator 10 that latches a shutter speed information calculated by the arithmetic operation circuit 7 and a read only memory (ROM) device 11 that stores the information outputted d from the accumulator 10. The ROM 11 is provided with 18 output lines $a'\sim c'$, $d'\sim j'$, $k'\sim q'$ and $r'$ corresponding to the number of the luminous segments a through r constituting the LED segments 1-A through 1-D, AND gate circuits 12, 13, 14 and 15 for respective LED digits and LED drivers 16, 17, 18 and 19 thereof.

The display control circuit 9 comprises a NAND gate circuit 20 supplied with an alarm signal at a L level when the calculated shutter speed is in the control range of the camera, whereas an alarm signal at a H level when the calculated shutter speed is on the outside of the control range, and a timing pulse generator 21 which causes the NAND gate circuit 20 to generate output signals 20-A through 20-D to be described later when the alarm signals generated by the arithmetic calculating circuit 7 are at the H level. The output signals 20-A through 20-D are applied to one inputs of the AND gate circuits 12 through 15 respectively of the decoder 8 to control the code bits outputted from these AND gate circuits. Between the arithmetic operation circuit 7 and the timing pulse generator 21 is interposed an oscillator 22 which is connected to receive a frequency division signal and to apply its oscillation output to the arithmetic operation circuit 7. In response to the output of the oscillator 22, the timing pulse generator 21 sequentially generates pulse signals 21-1 through 21-4 lagged successively.

When the alarming and display system having a construction described above is used in a iris priority mode and a code corresponding to a shutter speed is set to "2000" shown in the table all of these four digits can be lighted or not lighted when the shutter speed is adequate, whereas when the shutter speed is not optimum these four digits can be sequentially turned off at a predetermined interval thus giving an alarm.

When the shutter speed is in the control range of the camera, the arithmetic operation circuit 7 sends a L level alarm signal to the NAND gate circuit 22 whereas a H level alarm signal when the shutter speed is on the outside of the control range of the camera. When the alarm signal is at the L level, no alarm is displayed, whereas when the alarm signal is at the H level an alarm is displayed. Such alarm display can be made when the timing pulse generator 21 produces pulses 21-1 through 21-4 and when the NAND gate circuit 20 produces output signals 20-A through 20-D in response to the pulses 21-1 through 21-4 produced by the timing pulse generator 21 and the alarm signal sent from the arithmetic operation circuit 7. Since respective pulses 21-1 through 21-4 lag sequentially by a predetermined period equal to the width of a H level pulse, the outputs of the NAND gate circuit 20 sequentially control respective AND gate circuits 12 through 15 with a predetermined interval.

Figure 3:
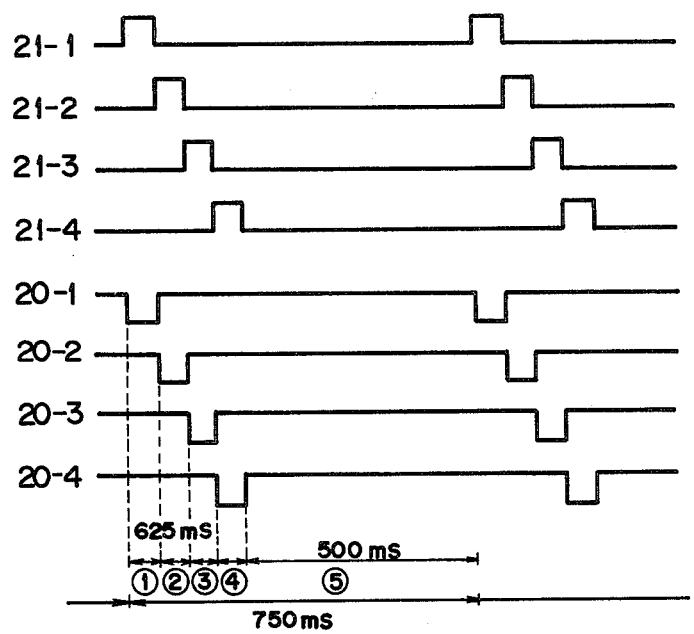
FIG. 3 is a timing chart useful to explain the operation of the circuit shown in FIG. 1
Figure 4:
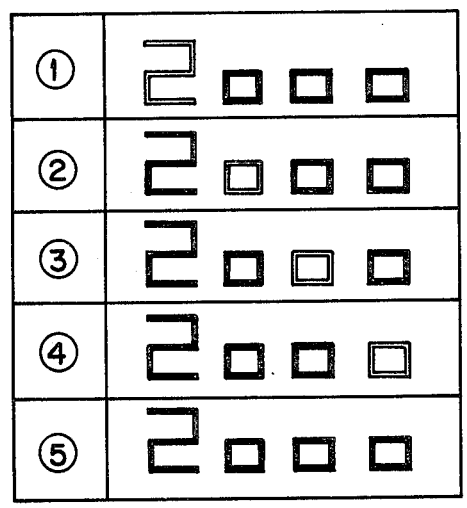
FIG. 4 is a diagram showing one example of a digital display.

When the waveforms of the signals 21-1 through 21-4 shown in FIG. 3 are at a time ⑤ signals 21-1, 21-2 and 21-4 are at the L level while signals 20-1, 20-2, 20-3 and 20-4 are at the H level. Under these conditions, the AND gate circuits 12 through 15 produce signals at the same logic level as those of the outputs a through r outputted from the read only memory device 11. Since the input codes to the read only memory device correspond to the display "2000" the outputs of this memory device 11 become a'="H", b'="H", c'="L", d'="L", e'="L", f'="H", g'="H", h'="H", i'="L", j'="H", k'="L", l'="L", m'="H", n'="H", o'="H", p'="L", q'="H" and r'="H" thus turns ON the digital display "2000" shown in FIG. 4-⑤. Considering in more detail the memory output a', since the input a' to the AND gate circuit 12 is at the level H and the input 20-A is also at the level H, the AND gate circuit turns on the LED segment a. In FIG. 3, at time ③, since the NAND gate outputs 20-A="L", 20-B="H", 20-C="H" and 20-D="H", the AND gate circuits 13, 14 and 15 respectively supplied with these outputs are enabled to output code bits. The AND gate circuit 12 supplied with the H level output 20-A produces a L level output so that LED segments a, b and c are not lighted. Accordingly, the digital display would become "000" as shown in FIG. 4-①. In this manner, according to the pulse signals the waveforms of the output signals produced by the NAND gate circuit 20 are varies at times ②, ③ and ④ as shown in FIG. 3 and the outputs of the AND gate circuits 12 through 15 are controlled by these waveforms so that digital displays "2 00", "20 0" and "200" can be made as shown in FIG. 4-②, ③ and ④. Accordingly, inoperative digits sequentially move from left to right at a predetermined interval. Advantageously, the width of the turn off pulse may be about 62 ms necessary to confirm turned off LED segments, and the period of the pulses may be about 750 ms. The period of the pulses determines the repetition speed of the turning on and off of the digits and it is advantageous to select this period to be in a range of from 500 ms to one second sufficient to give an alarm to the user of the camera.

Although foregoing embodiment was described in connection with an iris priority type exposure mode, it will be clear that the system of this invention can also be applied to a shutter priority type exposure mode to give an iris opening information alarm and to display a trembling alarm. A flickering display device may be added. As above described, according to this invention a plurality of digits arranged in the field of view of a camera finder and the digits are sequentially turned on and off at a predetermined period so that it is possible to display photographic informations or to give an alarm to the user of the camera by the sequential on or off of the digits.

What is claimed is:

1. A photographic information display system of a photographic camera having a finder comprising:
    (a) a plurality of digits arranged in a field of view of said finder,
    (b) an arithmetic operation circuit inputted with digital photographic information for producing digital code bits,
    (c) a memory circuit for storing outputs of said arithmetic operation circuit,
    (d) a timing pulse generator supplied with the output signal of an oscillator for producing successively lagged pulse signals,
    (e) a NAND gate circuit supplied with the output signal of said arithmetic operation circuit and the pulse signals outputted by said timing pulse generator for judging whether a photographic information outputted by said arithmetic operation circuit is adequate or not for outputting successively lagged pulse signals,
    (f) AND gate circuits of a number corresponding to that of said digits and respectively supplied with binary informations read out from said memory circuit and said lagged pulse signals outputted by the NAND gate circuit, and
    (g) digit drivers respectively supplied with binary informations outputted from said AND gate circuits for driving said digits,
whereby sequentially to turn on or off said digits at a predetermined period for giving an alarm to a user of said photographic camera.

2. The photographic information display system according to claim 1 wherein each digit comprises a plurality of luminous segments selectively energized to display any one of digits of 0 through 9.

3. The photographic information display system according to claim 1 wherein said decoder comprises a memory circuit for storing outputs of said arithmetic operation circuit, AND gate circuits of a number corresponding to that of said digits and respectively supplied with binary informations read out from said memory circuit and said pulse signals, and digit drivers repectively supplied with binary informations outputted from said AND gate circuits for driving said digits.

4. The photographic information display system according to claim 1 which further comprises an oscillator which supplies its output signal to said arithmetic operation circuit, and wherein said display control means comprises a timing pulse generator supplied with the output signal of said oscillator for producing said successively lagged pulse signals.

5. The photographic information display system according to claim 1 which further comprises means for supplying to said arithmetic operation circuit a brightness information of an object to be photographed, means for supplying an iris opening information to said arithmetic operation circuit and a register for supplying to said arithmetic operation circuit a shutter speed information, a film sensitivity information, and a set iris opening information.

6. The photographic information display system according to claim 1 which is constructed to operate in an iris priority mode.

7. The photographic information display system according to claim 1 which is constructed to operate in a shutter speed priority mode.

* * * * *